March 14, 1950     E. EGER     2,500,531
INNER TUBE VALVE
Filed Oct. 17, 1947
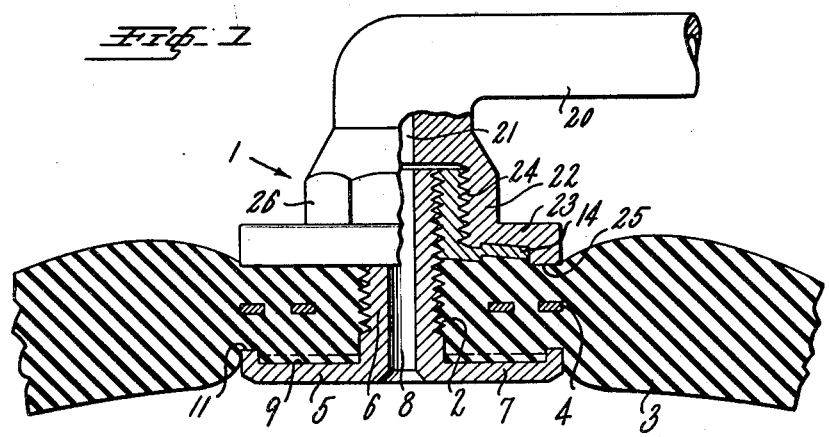
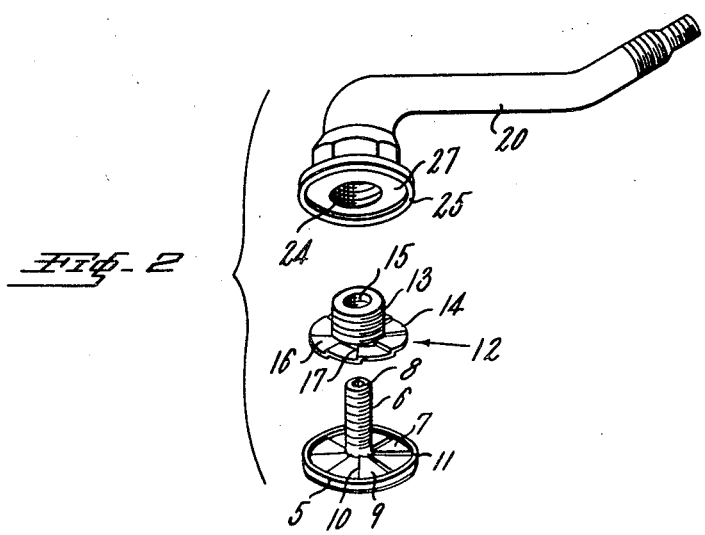
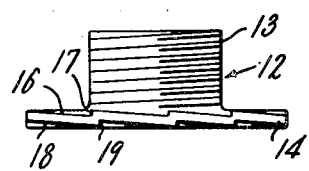
INVENTOR.
ERNST EGER
BY Henry P. Truesdell
ATTORNEY Patented Mar. 14, 1950

2,500,531

UNITED STATES PATENT OFFICE 2,500,531

INNER TUBE VALVE

Ernst Eger, Los Angeles, Calif., assignor to United States Rubber Company, New York, N. Y., a corporation of New Jersey Application October 17, 1947, Serial No. 780,385

7 Claims. (Cl. 152—429)

My invention relates to valves for inner tubes and more particularly to a valve construction having interchangeable valve stems. From one viewpoint, my invention is in the nature of an improvement on the valve structure described and claimed in my Patent 1,901,637 dated March 14, 1933.

In interchangeable valve structures of the type described in said patent, a wide variety of valve stems having different sizes and shapes are designed to be mounted on a standard base portion assembled in the wall of the inner tube. The tire dealer stocks a quantity of inner tubes and simply installs any desired size or shape of valve stem in accordance with the particular requirements of the customer. In shipping the inner tube with the base of the valve structure assembled thereon, a retaining cap has heretofore been mounted on the valve base to hold it in assembled position in the wall of the inner tube. Before mounting the particular valve stem on the base, it is necessary to remove this shipping cap. This further complicates the task of installing the valve stem and, in some instances, permits the valve base to fall out of position in the wall of the inner tube. To overcome these difficulties, I have provided an improved valve construction in which the retaining cap is eliminated and which is so constructed as to be securely held in position in the wall of the inner tube at all times. Any chosen valve stem may be mounted directly thereon without any adjustment or removal of the valve parts carried by the wall of the inner tube.

Therefore, it is an object of my invention to provide a new and improved valve construction for inner tubes having interchangeable valve stems which may be mounted directly on a portion of the valve structure carried by the inner tube.

Another object of my invention is the provision of an inner tube valve having interchangeable valve stems the arrangement being such as to prevent leakage of air around the valve.

A further object is to provide an improved interchangeable valve for inner tubes in which provision is made to prevent rotation of the valve stem in a direction tending to loosen or remove the stem once it is installed on the inner tube.

In the accompanying drawing,

Fig. 1 illustrates an interchangeable valve structure constructed in accordance with my invention and installed in the wall of an inner tube;

Fig. 2 is an exploded perspective view of the valve structure; and

Fig. 3 is a view of an adapter forming part of the valve structure.

Referring to the drawing, Fig. 1 illustrates an interchangeable valve structure 1 mounted in an opening 2 in the wall of an inner tube 3. If desired, the wall of the inner tube adjacent the opening may be reinforced by means of fabric or metal rings 4. The valve structure is so designed that it may be screwed down tightly in the opening 2 so that the valve parts engage the wall of the tube to provide a fluid-tight seal.

The valve structure includes a base 5 having a centrally disposed threaded stud portion 6 and a laterally extending circular flange 7. An opening 8 extends through the base to provide for inflation of the inner tube. The upper surface of the flange which engages the inner wall of the tube is provided with a series of beveled surfaces 9 which terminate in abrupt faces forming, in effect, a series of spaced teeth 10 radiating from the center stud 6. The teeth engage the inner wall of the tube and prevent rotation of the base 5 when the remaining parts of the valve structure are threaded into position. In addition, the flange is provided with an upstanding rib 11 which is disposed circumferentially around the edge of the flange and which is adapted to be forced into engagement with the rubber stock of the tube wall to form a fluid-tight seal.

Cooperating with the base of the valve is an adapter 12 having a threaded extension 13 and a flange portion 14. In order to mount the adapter it is provided with a threaded opening 15 for receiving the threaded stud 6 of the base 5. The construction is such that the adapter is threaded down on the stud 6 of the base into clamping engagement with the outer wall of the inner tube. As shown by Figs. 2 and 3, the flange of the adapter is provided on its upper surface with a series of sloping or beveled surfaces 16 which terminate in a series of abrupt faces forming, in effect, a series of spaced teeth 17 which radiate from the center extension. It should be noted that the teeth 17 have sharp edges so that they are capable of biting into a portion of the valve stem for a purpose to be described later. The opposite or lower face of the adapter flange is similarly provided with a series of sloping or beveled surfaces 18 which parallel the upper surfaces 16 and which terminate in a series of curved faces forming spaced teeth 19, as best shown by Fig. 3. The teeth 19 likewise radiate from the center extension 13. They are adapted to engage and firmly grip the outer wall of the inner tube as the adapter is threaded down on the base. The teeth 19 tend to bite into the rubber stock of the tube wall and serve to prevent rotation of the adapter once it has been threaded down onto the valve base. However, since the faces forming the teeth 19 are slightly rounded or curved there is no danger of the teeth tearing or scoring the rubber stock of the tube wall. It will be apparent from Fig. 3 that the teeth 17 and 19 face in opposite directions.

In order to supply air to the inner tube a valve stem 20 is mounted on the adapter 12. It contains the conventional air inlet valve, not shown. As already mentioned, the valve stem 20 may take any one of a number of forms depending upon the particular wheel or tire in which the inner tube is to be installed. The valve stem is provided with an opening 21 for passage of air to the interior of the tube. It is also formed with an enlarged head portion 22 having a laterally extending flange 23 and a threaded recess 24 for receiving the extension 13 of the adapter. A raised bead 25 extends circumferentially around the flange and engages the wall of the inner tube to provide a tight seal. Outer surfaces of the head portion adjacent the flange are flattened, as indicated at 26, for receiving a wrench to tighten the valve stem on the adapter. The lower face of the flange 23 is formed as a flat surface 27 for engagement with the teeth 17 on the upper surface of the adapter flange. As shown in Fig. 1, when in seated position the bead 25 of the stem flange extends over the outer edge of the flange 14 on the adapter so that the edge of the bead rests against the outer wall of the inner tube. In this way leakage of fluid between the adapter and valve stem is prevented.

In assembling the valve structure on the inner tube, the base 5 is inserted through an opening in the inner tube and the adapter 12 threaded down on the stud 6 so that the adapter and base are held securely in position on the tube. It is not necessary to tighten the adapter on the base at this time. Inner tubes with the thus partially assembled valve structure are shipped to the dealer who completes the valve assembly. After selecting the particular configuration of valve stem desired, the dealer threads the stem onto the extension 13 of the adapter. As the valve stem is threaded down on the adapter the stem flange 22 engages the flange 14 of the adapter so that thereafter the adapter and valve stem are threaded as a unit on the stud 6 of the base. As the valve stem is tightened down on the base by clockwise rotation, the beveled surfaces 18 of the adapter flange ride freely over the wall of the inner tube. At the same time, the bead 25 of the stem flange is clamped in fluid-tight relationship against the wall of the inner tube. During tightening of the valve stem, the flange 7 of the base is pulled up tightly against the inner wall of the tube so that the bead 11 is clamped against the inner wall of the tube to provide a fluid tight seal. Rotation of the base 5 relative to the stem is prevented by the teeth 10 which grip the tube wall.

Since the valve stem is threaded on the base, it will be apparent that there may be a tendency for the stem to become unthreaded or loosened in use. This tendency is overcome by the teeth 17 of the adapter flange. If the valve stem tends to become unthreaded from the adapter, the teeth 17 will bite into the surface 27 of the valve stem flange to prevent rotation of the stem once it has been assembled in position. Similarly, the adapter 12 itself is prevented from becoming unthreaded from the base due to the action of the teeth 19 on the lower surface of the flange which frictionally engage the rubber stock of the tube wall to prevent rotation of the adapter. In this way, once the valve stem has been assembled in position on the inner tube neither the valve stem nor the adapter can become loosened.

The valve structure is one which may be easily and quickly mounted on an inner tube and which makes possible the use of a wide variety of valve stem designs with a single form of inner tube. This makes it unnecessary for the dealer to stock tubes with all varieties of valve stems.

Having thus described my invention, what I claim and desire to protect by Letters Patent is:

1. A valve structure for inner tubes comprising, in combination, a base portion having a flange adapted to contact the inner wall of the tube and a stud portion extending through an opening in the tube, an adapter mounted on said stud and having a flange cooperating with the flange of said base portion to grip the wall of the inner tube to hold the base portion in position, and a stem mounted on said adapter being provided with a flange portion part of which engages the flange of the adapter and part of which engages the wall of the inner tube and cooperates with the flange on the base to prevent leakage of fluid around the valve.

2. A valve structure for inner tubes comprising, in combination, a base portion having a flange adapted to contact the inner wall of the tube and a stud portion extending through an opening in the tube, an adapter mounted on said stud and having a flange cooperating with the flange of said base portion to grip the wall of the inner tube to hold the base portion in position, and a stem threaded on said adapter and being provided with a flange portion engaging said flange of the adapter to clamp the adapter and base to the wall of the inner tube.

3. A valve structure for inner tubes comprising, in combination, a base portion having a flange adapted to contact the inner wall of the tube and having a stud portion extending through an opening in the tube and an adapter mounted on said stud and having a flange cooperating with the flange of said base portion to grip the wall of the inner tube, the tube contacting surfaces of the flanges having teeth sloping in opposite directions to prevent rotation of the flanges in one direction when clamped against the wall of the inner tube, and a stem threaded on said adapter and being provided with a flange portion engaging said flange of the adapter to clamp the adapter and base against opposite wall of the inner tube.

4. A valve structure for inner tubes comprising, in combination, a base portion having a flange adapted to contact the inner wall of the tube and a threaded stud extending through the opening in the tube, an adapter threaded on said stud, said adapter having a threaded extension and a flange cooperating with the flange of the base portion to grip the wall of the inner tube, said adapter flange being provided with spaced teeth facing in opposite directions on opposite sides thereof, and a valve stem threaded on the adapter extension and being provided with a flange portion engaging the toothed flange of the adapter, the teeth on one side of the adapter flange cooperating with the stem flange to prevent rotation of the stem in one direction and the teeth on the opposite side cooperating with the wall of the inner tube to prevent rotation of the adapter and stem in said one direction.

5. A valve structure for inner tubes comprising, in combination, a base portion having a flange provided with a raised rib adapted to contact the inner wall of the tube and a threaded stud extending through an opening in the tube, an adapter threaded on said stud, said adapter having a threaded extension and a flange cooperating with the flange of the base portion to grip the wall of the inner tube, said adapter flange being provided with spaced teeth facing in opposite directions on opposite sides thereof, and a valve stem threaded on the adapter extension and being provided with a flange portion engaging the toothed flange of the adapter and a raised rib engaging the outer wall of the tube and cooperating with the rib on the base for making a fluid seal around the valve as the stem is threaded down on the extension, the teeth on one side of the adapter flange cooperating with the stem flange to prevent rotation of the stem in one direction and the teeth on the opposite side cooperating with the wall of the inner tube to prevent rotation of the adapter and stem in said one direction.

6. A valve structure for inner tubes comprising, in combination, a base portion having a flange adapted to contact the inner wall of the tube and a stud portion extending through an opening in the tube, an adapter mounted on said stud and having a flange cooperating with the flange of said base portion to grip the wall of the inner tube to hold the base portion in position, said adapter flange being provided with spaced teeth facing in opposite directions on opposite sides thereof, and a valve stem mounted on said adapter and being provided with a flange portion engaging said flange of the adapter to clamp the adapter and base to the wall of the inner tube, the teeth on one side of the adapter flange cooperating with the stem flange to prevent rotation of the stem in one direction and the teeth on the opposite side cooperating with the wall of the inner tube to prevent rotation of the adapter and stem in said one direction.

7. In a valve structure for supporting a valve stem having a flange portion, the combination of a base having a flange adapted to contact the inner wall of an inner tube and a stud portion extending through an opening in the tube, and an adapter mounted on said stud and having a flange cooperating with the flange of said base to grip the wall of the inner tube to hold the base in position, said adapter flange being provided with spaced teeth facing in opposite directions on opposite sides thereof, the teeth on one side of the adapter flange cooperating with the flange of the stem as the latter is mounted on the adapter to prevent rotation of the stem in one direction and the teeth in the opposite side cooperating with the wall of the inner tube to prevent rotation of the adapter and stem in said one direction.

ERNST EGER.

REFERENCES CITED

The following references are of record in the file of this patent:

UNITED STATES PATENTS

| Number | Name | Date |
| --- | --- | --- |
| 1,901,637 | Eger | Mar. 14, 1933 |

FOREIGN PATENTS

| Number | Country | Date |
| --- | --- | --- |
| 710,648 | France | 1931 |
| 712,992 | France | 1931 |